(12) United States Patent
Smith et al.

(10) Patent No.: US 11,229,318 B2
(45) Date of Patent: Jan. 25, 2022

(54) COOKWARE LEVELING SOLUTIONS

(71) Applicants: Mark T. Smith, Chicago, IL (US); Matthew T. Maggio, Schaumburg, IL (US)

(72) Inventors: Mark T. Smith, Chicago, IL (US); Matthew T. Maggio, Schaumburg, IL (US)

(*) Notice: Subject to any disclaimer, the term of this patent is extended or adjusted under 35 U.S.C. 154(b) by 119 days.

(21) Appl. No.: 16/454,764

(22) Filed: Jun. 27, 2019

(65) Prior Publication Data
US 2019/0313845 A1 Oct. 17, 2019

Related U.S. Application Data

(60) Continuation of application No. 15/450,290, filed on Mar. 6, 2017, now Pat. No. 10,376,095, which is a division of application No. 14/186,051, filed on Feb. 21, 2014, now Pat. No. 9,648,984.

(60) Provisional application No. 61/768,766, filed on Feb. 25, 2013.

(51) Int. Cl.
A47J 36/34 (2006.01)
F24C 15/10 (2006.01)
A47J 37/10 (2006.01)

(52) U.S. Cl.
CPC ............. A47J 36/34 (2013.01); A47J 37/108 (2013.01); F24C 15/107 (2013.01)

(58) Field of Classification Search
USPC ............................................ 99/449; 126/215
See application file for complete search history.

(56) References Cited

U.S. PATENT DOCUMENTS

| 1,612,521 | A |   | 12/1926 | Mcnaughton |
|-----------|---|---|---------|------------|
| 1,904,925 | A |   | 4/1933  | Perks |
| 2,871,848 | A |   | 2/1959  | Forbes |
| 2,903,229 | A |   | 9/1959  | Lange |
| 3,086,448 | A |   | 4/1963  | Forman |
| 3,215,063 | A |   | 11/1965 | Olson |
| 3,400,707 | A | * | 9/1968  | Owens ................... F24C 15/08 126/211 |
| 3,651,796 | A | * | 3/1972  | Nelson .................... F24C 15/10 126/215 |
| 4,109,567 | A | * | 8/1978  | Gage ....................... A47J 33/00 108/147.13 |
| 4,607,608 | A |   | 8/1986  | Allred |
| 4,732,138 | A |   | 3/1988  | Vos |

(Continued)

FOREIGN PATENT DOCUMENTS

DE 102004031921 1/2006

Primary Examiner — Nina Bhat

(57) ABSTRACT

Solutions for leveling the surface of cookware are disclosed. In one embodiment, at least one detachable adjustable leg makes contact with the stove surface to tilt the cooking surface to make it level. The pressure on the stove surface can be increased or decreased, thereby increasing the tilt until the cooking surface is level. In another embodiment, at least one detachable adjustable leg is weighted at one end and the weighted end extends outward to make the cooking surface level. In yet another embodiment, the cookware comes with at least one adjustable leg permanently attached. In all cases, multiple adjustable legs can be used to increase the stability and accuracy. In another embodiment, adjustable legs protrude from the top or bottom surface of a grate that typically covers a flame on gas stove surface.

20 Claims, 14 Drawing Sheets

(56) References Cited

U.S. PATENT DOCUMENTS

| | | | |
|---|---|---|---|
| 4,793,275 A | 12/1988 | Usher | |
| 5,002,039 A | 3/1991 | Esposito | |
| 5,381,989 A | 1/1995 | Jackson | |
| 5,575,445 A | 11/1996 | Kozdas | |
| 5,850,779 A * | 12/1998 | Zimmerman | A47J 36/34 99/425 |
| 6,289,885 B1 * | 9/2001 | Szadurski | F24C 15/10 126/215 |
| 6,711,993 B2 | 3/2004 | Robertson | |
| 6,725,856 B1 | 4/2004 | Barbour | |
| 6,796,221 B1 | 9/2004 | Cangioli | |
| 7,607,387 B2 * | 10/2009 | Stanczak | A47J 37/108 99/422 |
| 8,272,601 B2 * | 9/2012 | Kocher | A47J 33/00 248/121 |
| 8,668,949 B2 | 3/2014 | Wilson | |
| 8,820,310 B1 * | 9/2014 | Plott | A47J 37/0713 126/30 |
| 8,833,704 B1 | 9/2014 | Neighbors | |
| 9,612,012 B2 | 4/2017 | Yang | |
| 9,612,021 B2 * | 4/2017 | Wood | F24C 15/107 |
| 9,784,453 B2 * | 10/2017 | Hall | F24C 3/14 |
| 2004/0069149 A1 | 4/2004 | Wakefield | |
| 2005/0204931 A1 | 9/2005 | Cheng | |
| 2007/0012707 A1 | 1/2007 | Rattay | |
| 2008/0078895 A1 | 4/2008 | Hebert | |
| 2010/0320110 A1 | 12/2010 | Dougherty | |
| 2014/0326230 A1 * | 11/2014 | Hall | F16M 11/38 126/50 |
| 2016/0298854 A1 * | 10/2016 | Kuhn | A47J 37/0763 |

\* cited by examiner

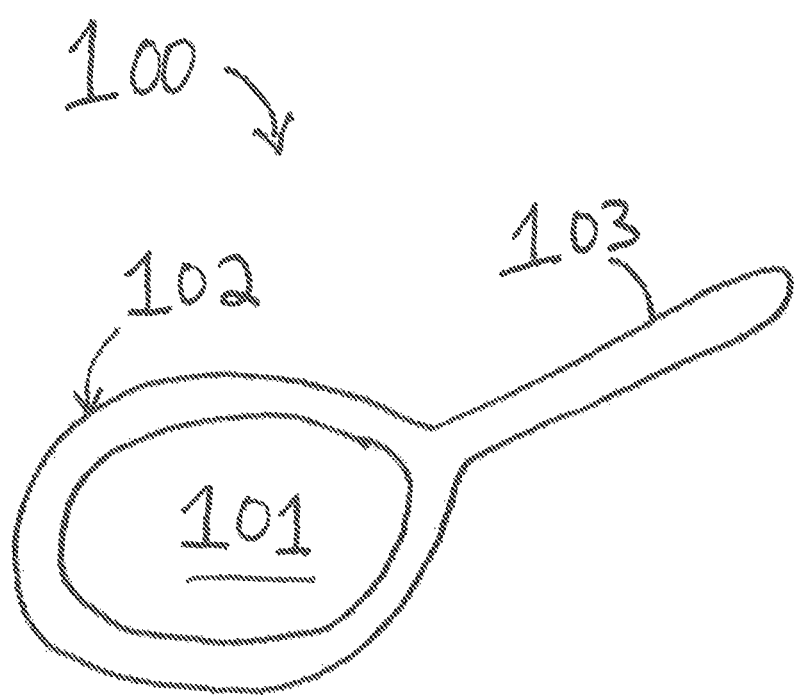
FIG. 1A: PRIOR ART

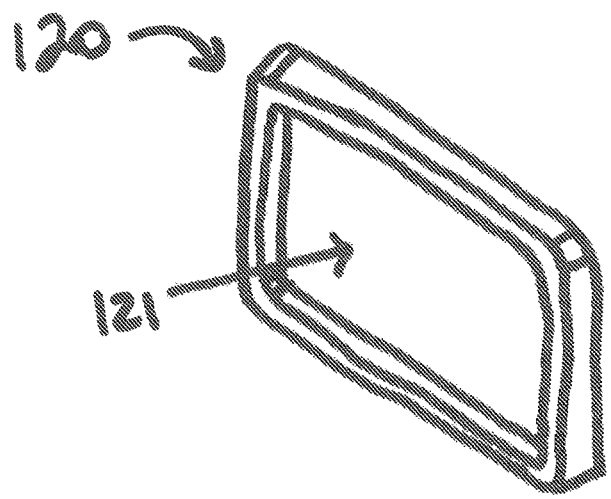
FIG 1B: PRIOR ART
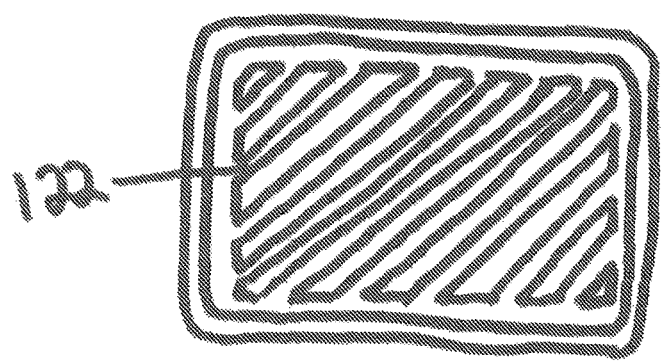
FIG 1C: PRIOR ART

COOKWARE LEVELING SOLUTIONS

PRIORITY CLAIM

This application is a continuation application from U.S. application Ser. No. 15/450,290, filed Mar. 6, 2017, which is a divisional application of U.S. application Ser. No. 14/186,051, both of which claim priority to U.S. provisional patent application Ser. No. 61/768,766, filed Feb. 25, 2013, the entire contents all of which are incorporated herein by reference and relied upon.

FIELD

The present disclosure relates generally to the field of cookware. More particularly, the present disclosure relates to solutions for leveling cookware with a flat cooking surface. By way of non-limiting example, the present disclosure can be applied to level frying pans, skillets, and griddles and on gas or electric stovetops.

BACKGROUND

Many people cook with oil or melted butter. In order to most effectively cook with oil or melted butter, a level cooking surface is preferred. If the cookware does not set on the stovetop such that the cooking surface remains level, then the cooking oil or melted butter will naturally leak to the lower side of the cooking surface. This requires constant shifting of the cookware by the chef in order to make sure the cooking oil or melted butter coats the entire cooking surface. If constant attention is not given, the cooking oil or melted butter will not evenly coat the cooking surface or the food being prepared.

SUMMARY

In an embodiment of the present disclosure, the problems of the prior art are overcome by including a detachable adjustable leg that can attach to the cookware. The leg adjusts to level the surface of the cookware. In one embodiment, the at least one detachable adjustable leg makes contact with the stovetop to tilt the cooking surface in order to make it level. The adjustable leg can be used to increase pressure on the stovetop, thereby increasing the tilt until the cooking surface is level. Multiple adjustable legs can be used to increase stability and accuracy. In another preferred embodiment, the at least one detachable adjustable leg is weighted at one end and the weighted end extends outward in order to make the cooking surface level. Multiple adjustable legs can be used to increase the stability and accuracy. In yet another embodiment, the cookware comes with at least one adjustable leg permanently attached for leveling.

The adjustable leg, detachable or permanent, can be made from any material able to withstand close proximity to a stovetop flame. The embodiments described herein can be applied to cookware being used on a gas stovetop or an electric stovetop or any cooking surface on which a level cooking surface is desired. The detachable adjustable legs can be designed to be secured to any cookware.

In another embodiment, the leveling of the cookware is accomplished by adjusting the surface of a grate that is typically used with gas stoves. The surface of the grate is adjustable by, for example, simply twisting legs on the top or bottom surface of the grate. Twisting legs on the bottom of the grate, such that the length that the leg protrudes from the bottom surface of the grate is altered, changes the tilt of the top surface of the grate. Alternatively, legs can be installed on the top surface of the grate such that the cookware rests on the legs. Adjusting the length that the legs protrude from the top surface of the grate changes the tilt of the cooking surface and therefore can be used to level the cooking surface. This embodiment can also be used with a grate configured to be used with an electric stove.

BRIEF DESCRIPTION OF THE FIGURES

The disclosure is more fully appreciated in connection with the following detailed description taken in conjunction with the accompanying drawings, in which:

FIGS. 1A-1C show prior art cooking pans.

Like reference numerals refer to corresponding parts throughout the several views of the drawings.

DETAILED DESCRIPTION

Figure 2A:
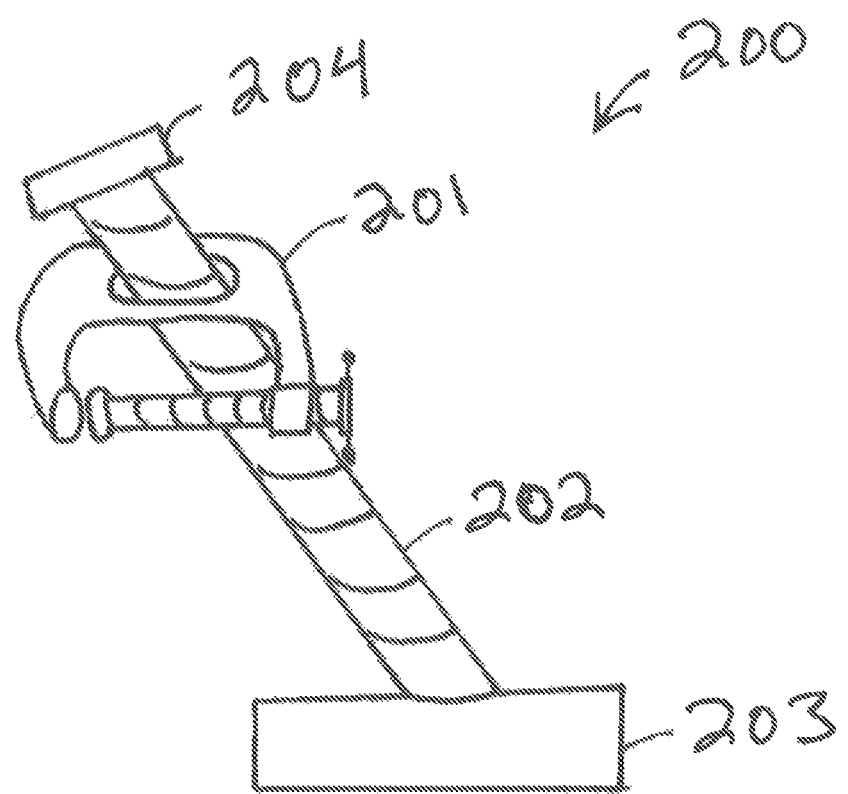
FIGS. 2A-2I show a first embodiment of a detachable adjustable leg stabilizer.

An embodiment of the present disclosure relates to a leveling the cooking surface of cookware. FIGS. 1A-1C show prior art cooking pans. FIG. 1A shows a prior art skillet or frying pan 100. As sold, the prior art skillet 100 typically includes a level cooking surface 101. The skillet 100 also includes a side wall 102 and a handle 103. FIGS. 1B and 1C show a prior art griddle 120. As sold, the prior art griddle 120 typically includes a level cooking surface. The griddle 120 can include a flat level cooking surface 121 as shown in FIG. 1B or a ribbed level cooking surface 122 as shown in FIG. 1C. As used herein, the term "flat cooking surface" comprises flat level cooking surfaces, ribbed level cooking surfaces, as well as cooking surfaces that are partially or totally warped such that they are not entirely level. A person of ordinary skill in the art will recognize that other prior art cookware includes a flat cooking surface and the disclosed embodiments that follow can be applied to that other prior art cookware.

FIGS. 2A-2I show a first embodiment of a detachable adjustable leg stabilizer. FIG. 2A shows a detachable adjustable leg stabilizer 200. The detachable adjustable leg stabilizer 200 includes a clamp 201 for attaching to the rim of the cookware at a first end. The clamp 201 can be magnetized. The second end 203 of the detachable adjustable leg stabilizer 200 is capable of making contact with the stove surface. The second end 203 can be a flat piece for greater stability or can be a pointed end. The second end 203 can magnetized. The second end 203 can also be made of rubber or another material, including materials that increase friction between the second end 203 and the stove surface. The second end 203 of the adjustable leg 202 can be part of the adjustable leg 202 or can be a separate piece that is attached to the adjustable leg 202. The adjustable leg 202 is a rigid material. The adjustable leg 202 allows the distance between the first end 201 and the second end 203 to increase or decrease. The adjustable leg 202 does not have to change length. The adjustable leg 202 is used to allow the first end 201 to change positions relative to the second end 203 and that is what is meant by adjusting the adjustable leg 202. One method of adjusting the adjustable leg 202, shown in FIG. 2A, is a handle 204 that can twist to move the adjustable leg 202 in a screw-like fashion to apply angular pressure on the stove surface. The adjustable leg 202 of FIG. 2A is threaded and passes through a similarly threaded portion connected to the clamp 201. By twisting the adjustable leg 202, the adjustable leg 202 passes through the threaded portion connected to the clamp such that the second end 203 of the adjustable leg 202 moves closer or further from the threaded portion.

Figure 2B:
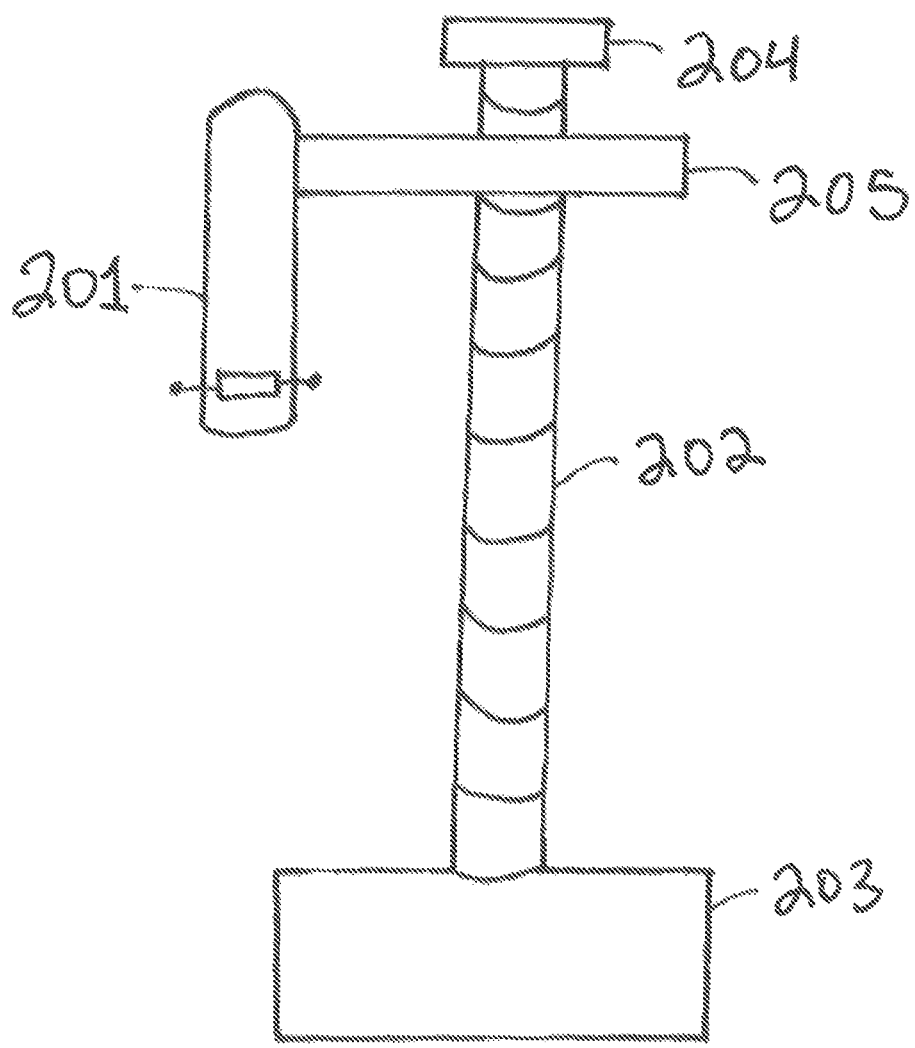

FIG. 2B shows a side view of the detachable adjustable leg stabilizer of FIG. 2A with an extender arm 205. The extender arm 205 is positioned substantially parallel to the stove surface such that the adjustable leg 202 pushes on the stove top from a more vertical alignment, causing downward pressure. The extender arm 205 can be threaded so that the adjustable leg 202 passes through it and allows the distance between the extender arm 205 and the second end 203 to be increased or decreased.

Figure 2C:
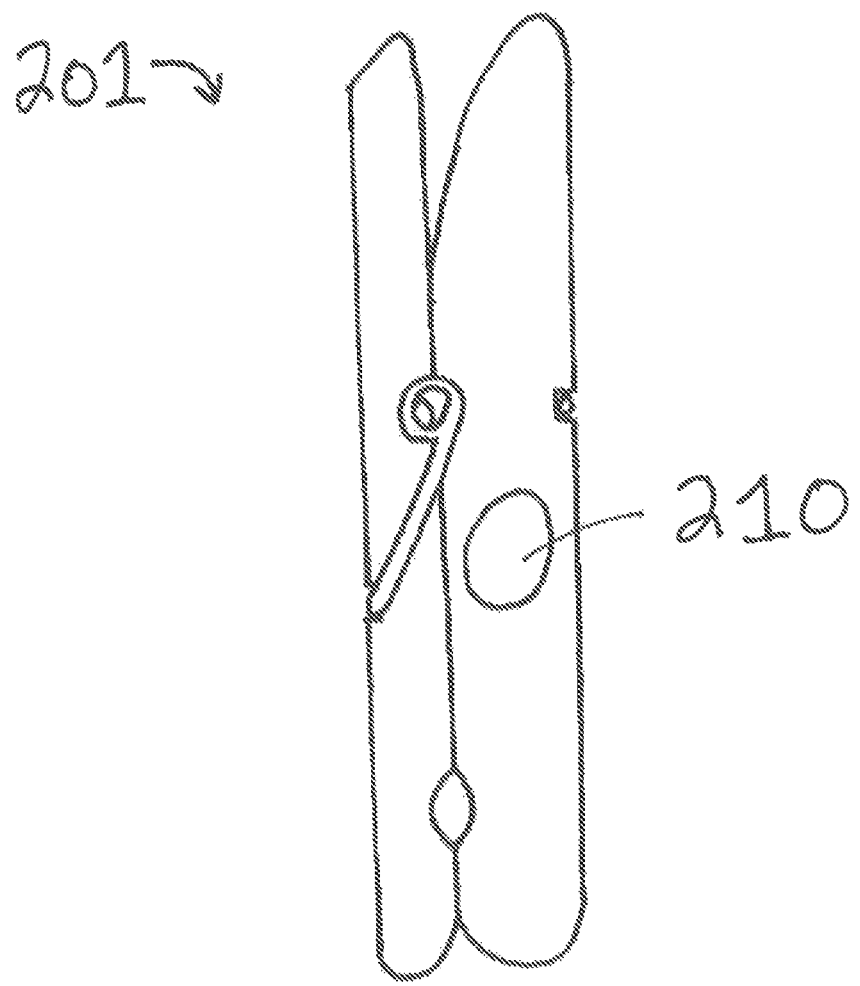

FIG. 2C shows another design for the clamp 201. The design shown in FIG. 2C works similar to a clothes-pin. Squeezing the top end of the clamp 201 shown in FIG. 2C will open the legs on the lower end. Releasing the top end of the clamp 201 shown in FIG. 2C will cause the lower end of the clamp 201 to tighten on the rim of the cookware. The adjustable leg 202 can be threaded through hole 210 shown in FIG. 2C, which is itself similarly threaded.

Figure 2D:
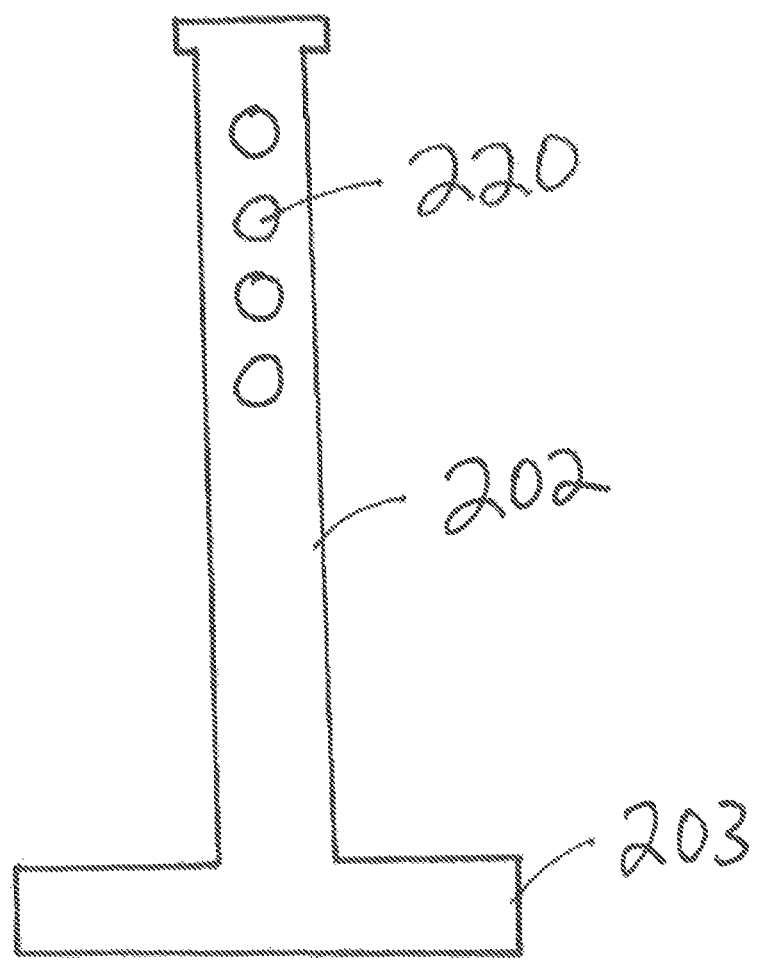

FIG. 2D shows another design for the adjustable leg 202. The adjustable leg 202 of FIG. 2D includes buttons 220 that can be depressed, but without pressure will pop back up to their original position. By pushing the buttons in and sliding the adjustable leg 202 the adjustable leg 202 will move in position. On the clamp 201 (not shown here) the hole for the adjustable leg 202 will fit snug on the adjustable leg 202 such that the adjustable leg 202 can move through the hole when a button is depressed, but the adjustable leg 202 cannot move if a button is not depressed. Once the desired position is reached, the button can be released and the adjustable leg 202 will be locked in place. One skilled in the art will appreciate that there are other variations regarding how to lock the clamp 201 in position along the adjustable leg 202 that are well-known in the art.

Figure 2E:
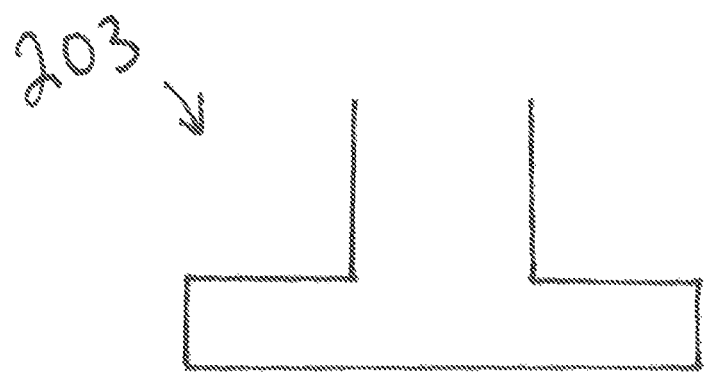
Figure 2F:
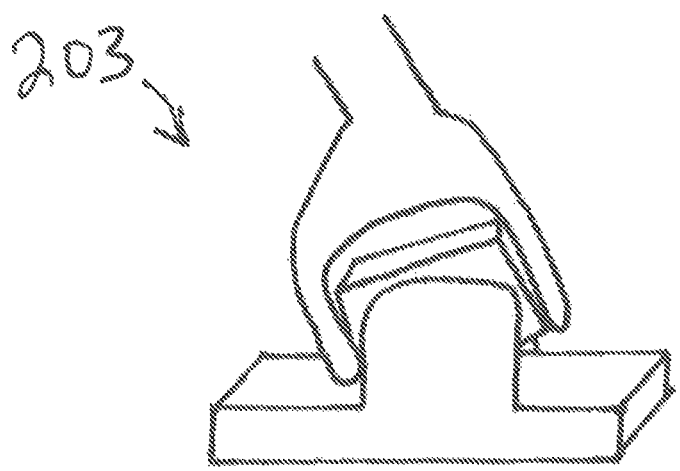
Figure 2G:
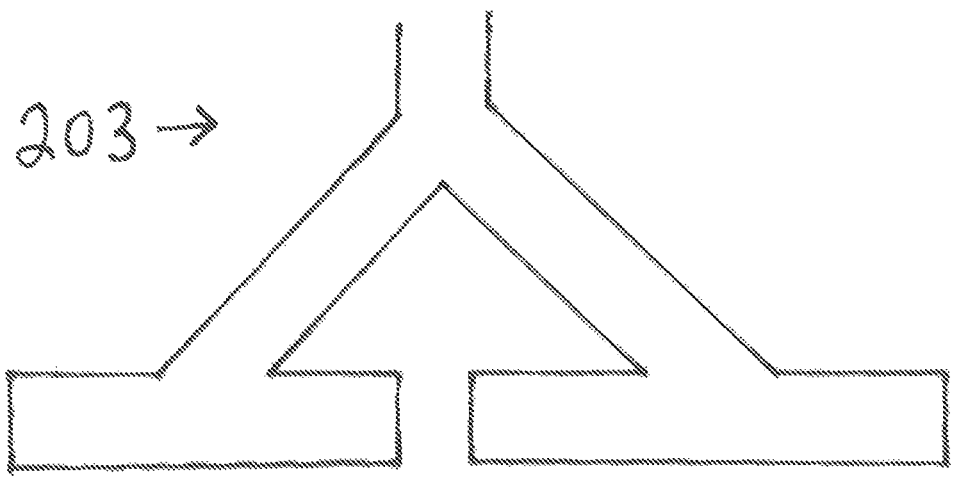
Figure 2H:
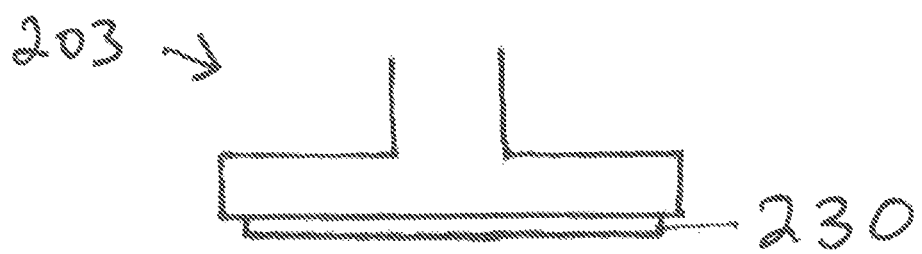
Figure 2I:
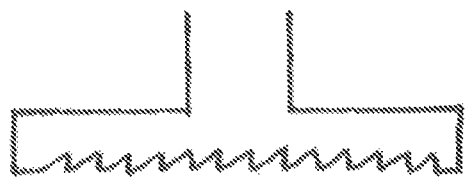

FIGS. 2E-2I show different designs for the second end 203 of the adjustable leg 202. FIG. 2E shows a simple rigid design for the second end 203 of the adjustable leg 202. The rigid design can be a flat surface or can be a rounded surface. FIG. 2E shows a flat surface. A flat surface should be designed to be flush to the stove surface when in use. A rounded surface will also work as long as it does not slip on the stove surface. The adjustable leg 202 may fit with the second end 203 on an angle or vertically, depending on whether the extender arm 205 is being used. FIG. 2F shows a second end 203 of the adjustable leg 202 that is flexible. The flexible second end 203 allows the adjustable leg 202 to always stay flush to the stove surface while allowing the adjustable leg 202 to change angles relative to the stove surface. FIG. 2F shows a simple hinge design, although other designs that accomplish the same flexibility are well-known in the art. FIG. 2G demonstrates that the second end 203 of the adjustable leg 202 can be multi-prong. A two-prong second end 203 is shown, but a person of ordinary skill in the art will recognize that any number of prongs is possible. FIG. 2H demonstrates that the second end 203 of the adjustable leg 202 can be magnetized for better stability with the stove surface by simply fastening a magnet 230 to the bottom surface of the second end 203. A person of ordinary skill in the art will recognize that any of the designs for the second end 203 can be magnetized. FIG. 2I demonstrates that the second end 203 of the adjustable leg 202 can include a ribbed underside for better grip to the stove surface. The ribbed underside can be made of metal, rubber, or any material that increase the grip between the second end 203 and the stove surface.

Figure 3A:
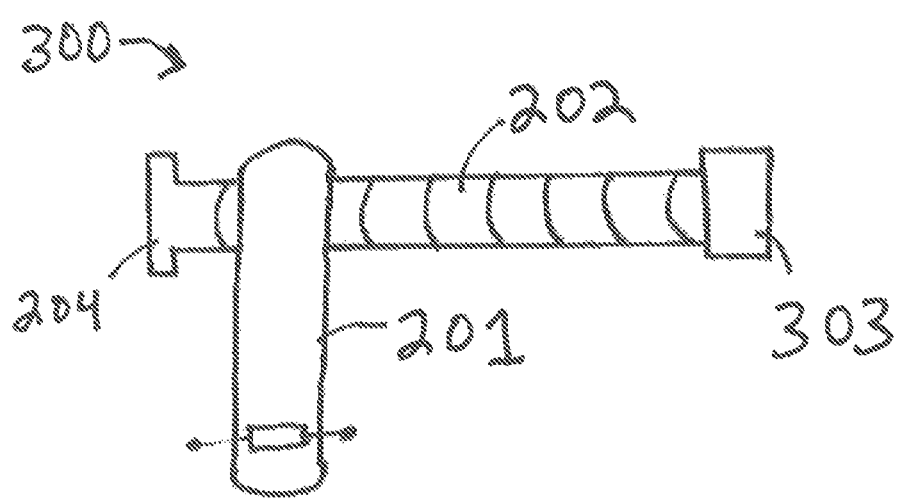
FIGS. 3A-3C show a second embodiment of a detachable adjustable leg stabilizer.
Figure 3B:
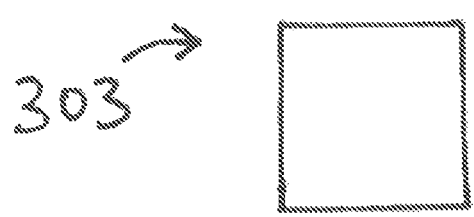
Figure 3C:
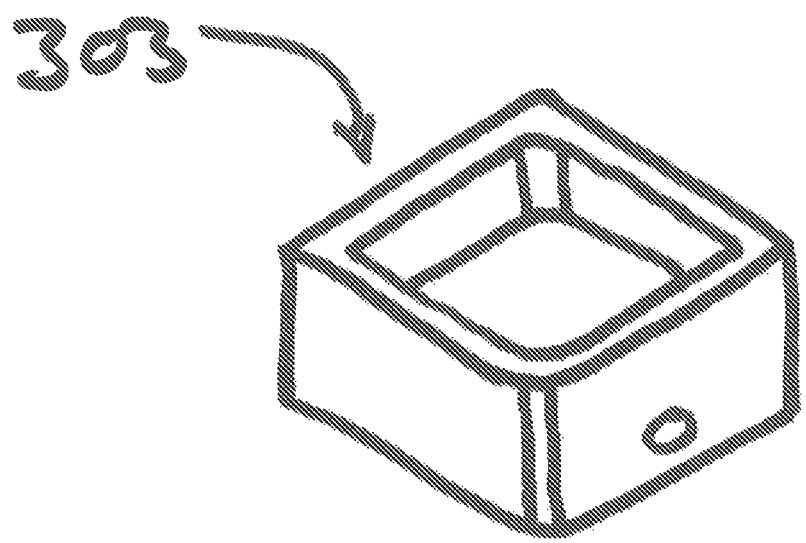

FIG. 3A shows a second embodiment 300 of the present disclosure. The adjustable leg 202 in the second embodiment extends outwards from the cookware, but does not contact the stove surface. Rather, the second end 303 of the adjustable leg 202 extending outward from the cookware causes the cooking surface to shift in the direction of the second end 303 of the adjustable leg 202. Extending the second end 303 outward causes a greater force to be exerted on the cookware in the direction of the second end 303. A person having ordinary skill in the art will recognize that the adjustable leg 202 can be designed in any of the ways described in connection with the first embodiment 200. Another variation on this embodiment is using a non-adjustable leg. FIG. 3B shows a first design for the second end 303 of the adjustable leg 202. The second end 303 shown in FIG. 3B is a solid weighted end. The solid weighted end can made of the same material of the adjustable leg 202 or can be a different material. FIG. 3C shows a top, side and cross-section view of a second design for the second end 303 of the adjustable leg 202. The second end 303 shown in FIG. 3C is basket-like such that the weight of the second end 303 can be adjusted by adding weights to the basket. The basket must face upwards so that weights can be added to the basket. To make sure that the basket will face up if a screw-like adjustable leg 202 is used, the basket can be threaded, as shown in the cross-section view, so that it can also be twisted to always face upwards. The weights added to the basket can be ball bearings or water or any suitable material. A person having ordinary skill in the art will recognize that anything that fits into to the basket can serve to weight the second end 303.

Figure 4:
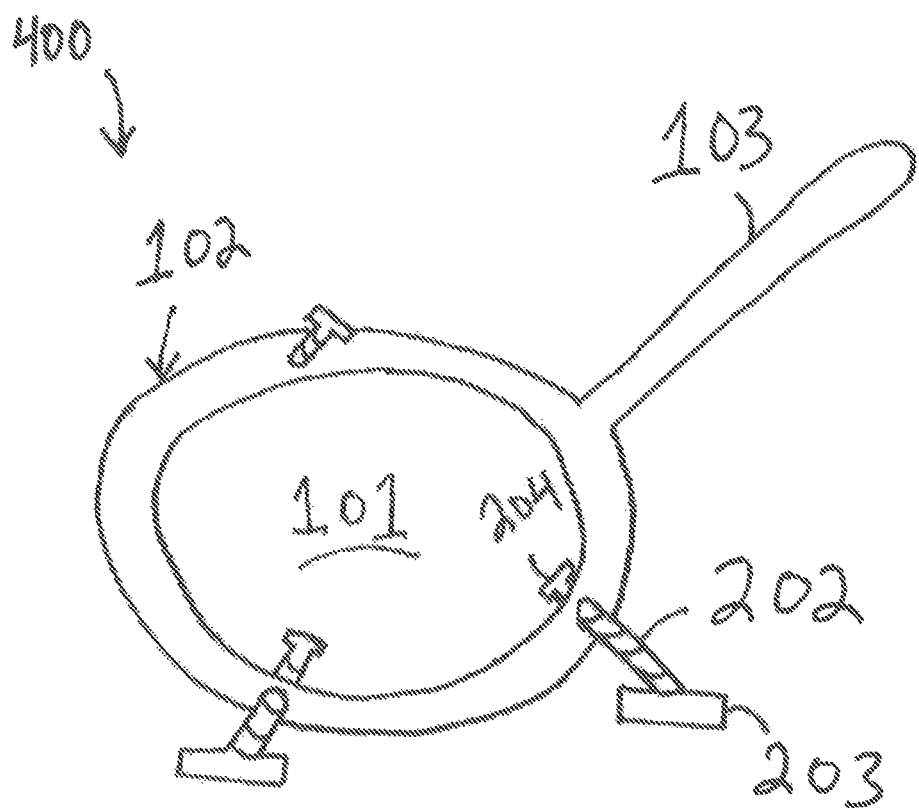
FIG. 4 shows a third embodiment whereby cookware includes permanent adjustable leg stabilizers.

In a third embodiment 400 of the present disclosure, at least one adjustable leg stabilizer is permanently incorporated into the cookware. FIG. 4 shows a third embodiment 400 of the present disclosure that is comparable to the first embodiment, except that instead of a detachable clamp 201, the one or more adjustable leg stabilizers 202 is permanently attached to the cookware at a first end 201. The adjustable leg 202 can be threaded through a threaded hole in the side wall 102 of the cookware. As will be appreciated by those skilled in the art, any described design for the adjustable leg 202 or the second end 203 is possible. And the third embodiment 400 can easily be adapted by using the extender arm 205 of FIG. 2B. As will further be appreciated, one or more permanent adjustable legs can be used with one or more detachable adjustable leg stabilizers to increase the accuracy and stability. As is shown in FIG. 4, the adjustable legs 202 are arranged in a triangle fashion. Those skilled in the art, however, will appreciate that any number of adjustable legs 202 can be used in any number of configurations. Further, FIG. 4 shows the threaded holes in the side wall 102 of the cookware. But the sidewall 102 can be extended upwards where the adjustable legs 202 are positioned as to keep the original sidewall intact.

Figure 5:
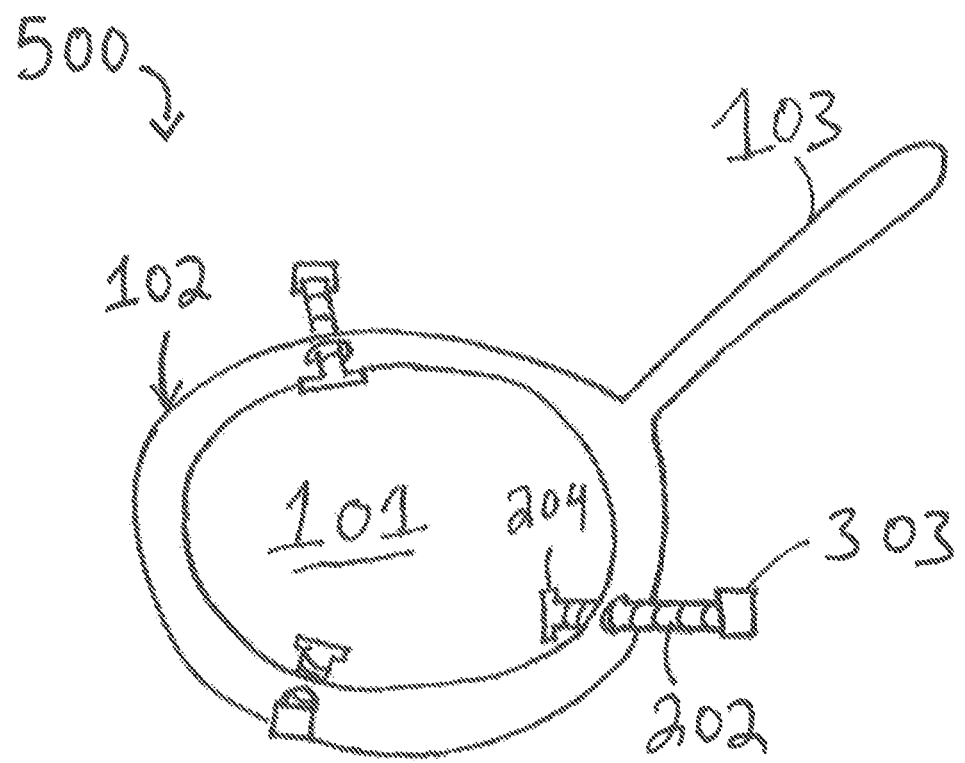
FIG. 5 shows a fourth embodiment whereby cookware includes permanent moveable weights.

FIG. 5 shows a fourth embodiment 500 of the present disclosure. As with the third embodiment 400, the fourth embodiment 500 includes at least one adjustable leg stabilizer permanently incorporated into the cookware at a first end 201. FIG. 5 shows a fourth embodiment 500 of the present disclosure that is further comparable to the second embodiment in that the adjustable leg extends outward from the cookware. FIG. 5 includes one or more screw-like adjustable legs 202 for extending the adjustable legs 202 outward from the cookware. The adjustable leg 202 can be threaded through a threaded hole in the side wall 102 of the cookware. The second end 303 is comparable to the second end 303 described in connection with the second embodiment. As will be appreciated by those skilled in the art, any described design for the adjustable legs 202 or the second end 303 is possible. Another variation on this embodiment is to use a non-adjustable leg and the basket-like second end 303 as shown in FIG. 3C. As will further be appreciated, one or more single permanent adjustable legs can be used with one or more detachable adjustable leg stabilizers to increase the accuracy and stability. As is shown in FIG. 5, the adjustable legs 202 are arranged in a triangle fashion. Those skilled in the art, however, will appreciate that any number of adjustable legs 202 can be used in any number of configurations. Further, FIG. 5 shows the threaded holes in the side wall 102 of the cookware. But the sidewall 102 can be extended upwards where the adjustable legs 202 are positioned as to keep the original sidewall 102 intact.

Figure 6A:
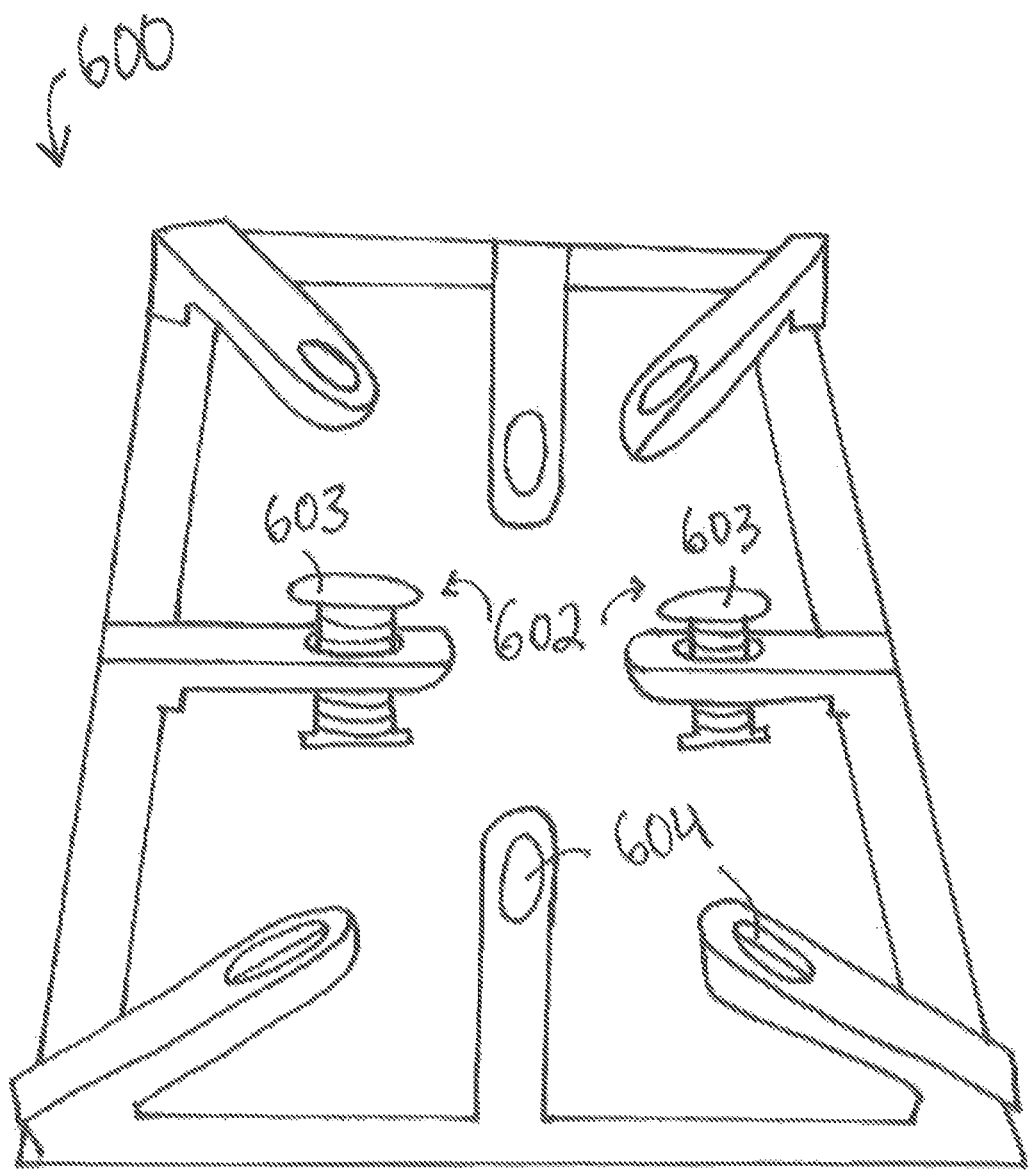
FIGS. 6A-6C show a fifth embodiment whereby leveling of the cooking surface is accomplished by adjusting legs that protrude from a grate that is often used with a gas stovetop.

In a fifth embodiment of the present disclosure, the leveling of the flat cooking surface is accomplished by adjusting protruding legs 602 on a grate 600 that typically sits over a gas stove. FIG. 6A shows an exemplary grate 600 with adjustable legs 602 on the top surface. The design of the grate 600 is only by way of non-limiting example, as many different designs within the scope of the present disclosure will accomplish the same result. This embodiment can also be used with a grate configured to be used with an electric stove. The cookware sets on the adjustable legs 602. The adjustable legs 602 protrude from the top surface and are adjustable, for example, by twisting them. The grate 600 can have threaded holes 604, as shown in FIG. 6A. Alternatively, one or more blocks, each having a threaded hole that mates with the adjustable legs 602, can be fastened to the top of a grate with no threaded holes. The adjustable legs 602 can be threaded such that twisting them causes the adjustable legs 602 to protrude more or less from the top surface of the grate 600. The top end 603 of the adjustable legs 602 that makes contact with the cookware can be rounded, flat, or any design that allows the cookware to stably set on the adjustable legs 602. Only two adjustable legs 602 are shown in FIG. 6A but a person of ordinary skill will recognize that any number of adjustable legs 602 can be used.

Figure 6B:
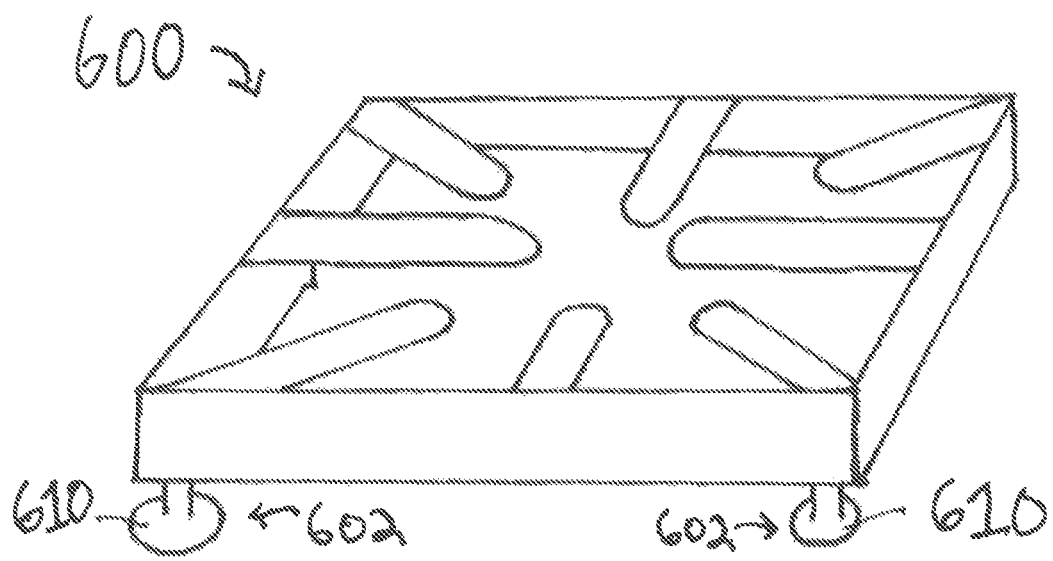

In FIG. 6B the adjustable legs 602 protrude from the bottom surface of the grate 600. In FIG. 6B, the adjustable legs 602 are in direct contact with the stove surface. The adjustable legs 602 protrude from the bottom surface and are adjustable, for example, by twisting them. The adjustable legs 602 can be threaded such that twisting them causes the adjustable legs 602 to protrude more or less from the bottom surface of the grate 600. As such, adjusting the length that the adjustable legs 602 protrude from the bottom surface of the grate 600 causes the tilt of the top surface of the grate 600 to change. The grate 600 can have threaded holes on the bottom surface. Alternatively, one or more blocks, each having a threaded hole that mates with the adjustable legs 602, can be fastened to the bottom of a grate with no threaded holes. The second end 610 of the adjustable legs 602 that makes contact with the stove surface can be rounded, flat, or any design that allows the grate to stably set on the stove surface. The design of the second end 610 of the adjustable legs 602 can be designed in any of the ways described in FIGS. 2E-2I.

Figure 6C:
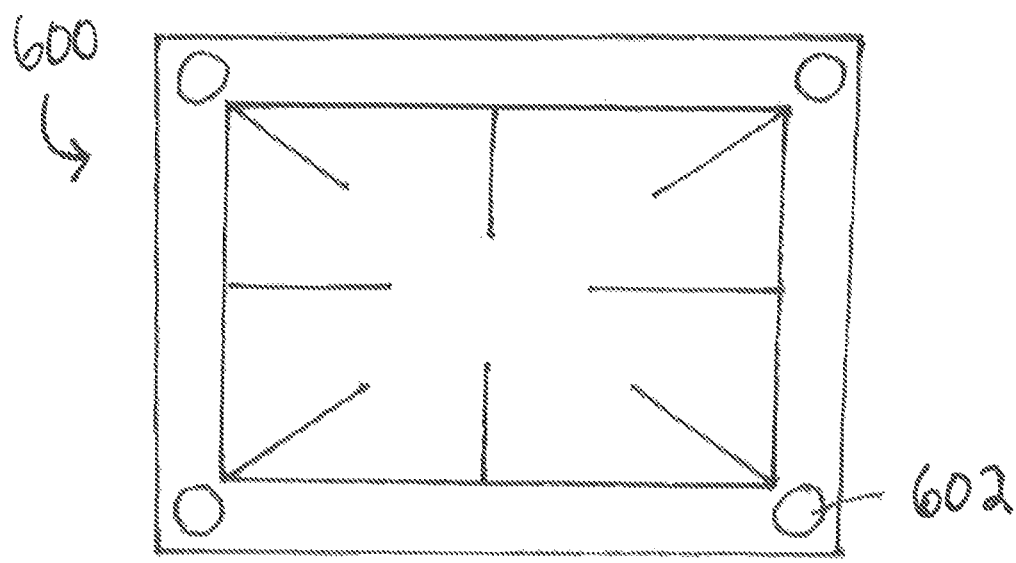

In FIG. 6C the adjustable legs 602 are represented as circles on the bottom of grate 600. FIG. 6C shows the same configuration as FIG. 6B but from a different angle. The perspective is shown as looking straight down on the bottom side of grate 600.

In one embodiment, the present disclosure provides an adjustable leg stabilizer for cookware comprising a first end secured to cookware having a flat cooking surface, and a rigid leg comprising a second end configured to contact a stove surface, wherein the rigid leg is connected with the first end, the first and second ends defining an adjustable distance. In some embodiments, the first end can detach from the cookware. In some embodiments, at least part of the rigid leg is threaded such that the distance between the first end and the second end is configured to be adjustable by twisting the rigid leg.

In another embodiment, the present disclosure provides an adjustable leg stabilizer for cookware comprising a first end secured to cookware having a flat cooking surface, a first rigid leg extending substantially parallel to said flat cooking surface, wherein the first rigid leg is configured to connect with the first end, and a second rigid leg configured to connect with the first rigid leg at a first point and at a substantially perpendicular angle to the first rigid leg while simultaneously in contact with a stove surface at a second point, wherein the first and second points define an adjustable distance. In some embodiments, the first end can detach from the cookware. In some embodiments, at least a portion of said second rigid leg is threaded such that the distance between said first point and said second point is configured to be adjusted by twisting said second rigid leg.

In another embodiment, the present disclosure provides a cooking pan comprising a flat cooking surface defining a plane, wherein a difference between the plane and a horizontal plane defines a tilt, and at least one rigid leg extending outwardly from the cooking pan, wherein the rigid leg is configured to exert adjustable pressure on a stove surface such that the tilt is capable of being reduced. In some embodiments, the flat cooking surface is ribbed or at least partially warped.

In another embodiment, the present disclosure provides a method of leveling a flat cooking surface comprising reducing a difference between a flat cooking surface defining a plane and a horizontal plane by adjusting pressure that a rigid leg exerts on a stove surface.

In another embodiment, the present disclosure provides a stovetop grate comprising a grate configured to be positioned over a flame on a stove surface, and at least one leg protruding from at least one surface of the grate, wherein a distance that at least one leg protrudes from the at least one surface is adjustable. In some embodiments, at least one leg protrudes from a bottom surface of said grate and contacts the stove surface. In some embodiments, at least one leg further comprises a bottom end configured to contact the stove surface, said bottom end having a rounded or flat shape. In some embodiments, at least one leg protrudes from a top surface of said grate such that cookware makes contact with the at least one leg when rested on said grate. In some embodiments, at least one leg further comprises a top end configured to contact a bottom surface of the cookware, said top end having a rounded or flat shape. In some embodiments, at least three legs protrude from the at least one surface of said grate and at least two of said at least three legs are adjustable.

In another embodiment, the present disclosure provides a method of leveling a flat cooking surface, the method comprising positioning a grate over a flame on a stove surface, wherein the grate comprises at least one leg protruding from the grate, wherein a distance that at least one leg protrudes is adjustable, placing a flat cooking surface on said grate or on said at least one leg, and adjusting a length of the at least one leg protruding from the grate until a plane defined by the flat cooking surface is substantially level. In some embodiments, at least one adjustable leg protrudes from a bottom surface of the grate and is in contact with the stove surface, wherein the flat cooking surface is placed on a top surface of the grate. In some embodiments, at least one adjustable leg protrudes from a top surface of the grate and wherein the flat cooking surface is placed on a top end of the at least one adjustable leg. In some embodiments, at least three legs protrude from the at least one surface of said grate and adjusting a length of at least two of said at least three legs until a plane defined by the flat cooking surface is substantially level.

In another embodiment, the present disclosure provides a stovetop grate comprising a grate configured to be used with an electric stove, and at least one leg protruding from at least one surface of said grate, wherein a distance that at least one leg protrudes from said at least one surface is adjustable.

The foregoing description, for purposes of explanation, used specific nomenclature to provide a thorough understanding of the disclosure. However, it will be apparent to one skilled in the art that specific details are not required in order to practice the present disclosure. Thus, the foregoing descriptions of specific embodiments of the present disclosure are presented for purposes of illustration and description. They are not intended to be exhaustive or to limit the claims to the precise forms disclosed; many modifications and variations are possible in view of the above teachings. The embodiments were chosen and described in order to best explain the principles of the disclosure and its practical applications, they thereby enable others skilled in the art to best utilize the present disclosure and various embodiments with various modifications as are suited to the particular use contemplated. It is intended that the following claims and their equivalents define the scope of the invention.

We claim:

1. A method of leveling cookware comprising:
    placing cookware on top of a grate configured to be positioned over a flame or stove surface wherein said grate includes at least one or more legs protruding from only the bottom surface of said grate; and
    adjusting at least one or more legs to level said cookware.

2. The method of claim 1 wherein at least part of said leg is threaded.

3. The method of claim 1 wherein said cookware is a frying pan.

4. The method of claim 1 wherein said at least one or more legs includes a magnetized end.

5. The method of claim 1 wherein said at least one or more legs includes a rubber end.

6. The method of claim 1 wherein said at least one or more legs includes a ribbed end.

7. The method of claim 1 wherein said at least one or more legs includes a multi-prong end.

8. A method of leveling cookware comprising:
    placing cookware on top of a grate configured to be positioned over a flame or a stove surface wherein said grate includes at least one or more legs protruding from the top surface of said grate and;
    adjusting at least one or more legs to level said cookware.

9. The method of claim 8 wherein at least part of said leg is threaded.

10. The method of claim 8 wherein said cookware is a frying pan.

11. The method of claim 8 wherein at lone or more legs includes a magnetized end.

12. The method of claim 8 wherein said at least one or more legs includes a rubber end.

13. The method of claim 8 wherein said at least one or more legs includes a ribbed end.

14. The method of claim 1 wherein said at least one or more legs includes a multi-prong end.

15. A method of adjusting the tilt of a grate comprising:
    a grate configured to be positioned over a flame or stove surface wherein said grate includes at least one or more legs;
    fastening a block having threaded holes to mate with said one or more legs; and
    twisting said one or more legs to adjust the tilt of the grate.

16. The method of claim 15 wherein said at least one or more legs includes a magnetized end.

17. The method of claim 15, wherein said at least one or more legs include a rubber end.

18. The method of claim 15, wherein said at least one or more legs include a ribbed end.

19. The method of claim 15, wherein said at least one or more legs include a multi-pronged end.

20. The method claim 15, wherein said block fastening is permanently affixed to the bottom surface of said grate.

* * * * *